(12) United States Patent
Schelling et al.

(10) Patent No.: US 8,343,250 B2
(45) Date of Patent: Jan. 1, 2013

(54) BAG HOUSE FILTERS AND MEDIA

(75) Inventors: Antoine Schelling, Geneva (CH); Kurt Hans Wyss, Chavannes De Bogis (CH); Glen E. Simmonds, Avondale, PA (US); Anil Kohli, Midlothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 192 days.

(21) Appl. No.: 11/799,562

(22) Filed: May 2, 2007

(65) Prior Publication Data

US 2008/0274312 A1 Nov. 6, 2008

(51) Int. Cl.
*B01D 46/00* (2006.01)
(52) U.S. Cl. ............... 55/486; 55/382; 55/487; 55/527
(58) Field of Classification Search .............. 55/382, 55/486, 487, 527, 528
See application file for complete search history.

(56) References Cited

U.S. PATENT DOCUMENTS

| | | | |
|---|---|---|---|
| 3,431,611 A | 3/1969 | Rentz | |
| 4,127,706 A | 11/1978 | Martin et al. | |
| 4,556,601 A | 12/1985 | Kirayogiu | |
| 4,955,116 A | 9/1990 | Hayamizu et al. | |
| 4,983,434 A | 1/1991 | Sassa | |
| 5,171,339 A | 12/1992 | Forsten | |
| 6,395,046 B1 * | 5/2002 | Emig et al. | 55/382 |
| 6,579,350 B2 * | 6/2003 | Doherty | 96/67 |
| 6,706,086 B2 * | 3/2004 | Emig et al. | 55/486 |
| 6,716,274 B2 * | 4/2004 | Gogins et al. | 95/273 |
| 6,740,142 B2 | 5/2004 | Buettner et al. | |
| 6,743,273 B2 * | 6/2004 | Chung et al. | 55/482 |
| 6,746,517 B2 * | 6/2004 | Benson et al. | 95/273 |
| 6,800,117 B2 * | 10/2004 | Barris et al. | 95/273 |
| 6,858,057 B2 * | 2/2005 | Healey | 55/528 |
| 6,872,311 B2 * | 3/2005 | Koslow | 210/502.1 |
| 6,942,711 B2 * | 9/2005 | Faulkner et al. | 55/486 |
| 6,966,939 B2 * | 11/2005 | Rammig et al. | 55/486 |
| 7,008,465 B2 * | 3/2006 | Graham et al. | 95/78 |
| 7,235,122 B2 * | 6/2007 | Bryner et al. | 95/287 |
| 7,318,852 B2 | 1/2008 | Chung et al. | |
| 7,993,523 B2 | 8/2011 | Chen et al. | |
| 8,038,013 B2 | 10/2011 | Chen et al. | |
| 2004/0065195 A1 | 4/2004 | Gogins | |
| 2007/0074628 A1 * | 4/2007 | Jones et al. | 95/273 |
| 2008/0314010 A1 * | 12/2008 | Smithies et al. | 55/498 |

FOREIGN PATENT DOCUMENTS

| | | |
|---|---|---|
| WO | WO 02/20129 | 3/2002 |
| WO | WO 03/080905 A1 | 10/2003 |
| WO | WO 2006/053295 A1 | 5/2006 |
| WO | WO 2008/109117 | 9/2008 |
| WO | WO 2008109117 A1 * | 9/2008 |

OTHER PUBLICATIONS

Filtration Properties of Electrospun Ultrafine Fiber Webs Korean J. Chem Eng.,22(1),165-172 (2005).
Development of High Efficiency Nanofilters Made of Nanofibers Elsevier.
N. Balasubramaania, Nonwovens-Bonding by needle-punching, found on the internet at: http://balanonwovenbonding.bravehost.com.
J. Foster, Needle Selection as it Pertains to Fiber Type, found on the internet at: http://www.fosterneedleusa.com/tch_pprs/nedlselect.html.
Foster Needle Co., Product Specifications: Felting Needle Gauge Diameter Measurements, found on the internet at: http://www.fosterneedleusa.com/prd/FeltNeedle.html.

* cited by examiner

*Primary Examiner* — Robert Clemente

(57) ABSTRACT

A bag filter having a support structure clothed in a filter bag. The cloth of the filter bag is a composite of at least one substrate layer and at least one nanoweb bonded thereto in a face-to-face relationship. The nanoweb is positioned at the surface of the filter bag first exposed to the hot particle laden gas stream and can have a basis weight of greater than about 2 gsm.

5 Claims, No Drawings

BAG HOUSE FILTERS AND MEDIA

FIELD OF THE INVENTION

This invention relates filters and to composites useful as filters in filtration of solids from fluid streams, as, for example, in industrial gas streams.

BACKGROUND

Dust collectors, also known as bag houses, are generally used to filter particulate material from industrial effluent or off-gas. Once filtered, the cleaned off-gas can be vented to the atmosphere or recycled. Such a bag house dust collector structure generally includes one or more flexible filter banks supported within a cabinet or similar structure. In such a filter cabinet and bank, the filter bag is generally secured within the cabinet and maintained in a position such that effluent efficiently passes through the bag thereby removing entrained particulates. The filter bag, secured within the cabinet, is typically supported by a structure that separates the upstream and downstream air and supports the filter bag to maintain efficient operation.

More specifically, in a so-called "bag house filter", particulate material is removed from a gaseous stream as the stream is directed through the filter media. In a typical application, the filter media has a generally sleeve-like tubular configuration, with gas flow arranged so as to deposit the particles being filtered on the exterior of the sleeve. In this type of application, the filter media is periodically cleaned by subjecting the media to a pulsed reverse-flow, which acts to dislodge the filtered particulate material from the exterior of the sleeve for collection in the lower portion of the bag house filter structure. U.S. Pat. No. 4,983,434, hereby incorporated by reference, illustrates a bag house filter structure and a prior art filter laminate.

The separation of particulate impurities from industrial fluid streams is often accomplished using fabric filters. These textile based filter media remove particulate from the fluids. When the resistance to flow or pressure drop through the textile caused by accumulation of particulate on the filter becomes significant, the filter must be cleaned, and the particulate cake removed.

It is common in the industrial filtration market to characterize the type of filter bag by the method of cleaning. The most common types of cleaning techniques are reverse air, shaker and pulse jet. Reverse air and shaker techniques are considered low energy cleaning techniques.

The reverse air technique is a gentle backwash of air on a filter bag which collects dust on the interior. The back wash collapses the bag and fractures dust cake which exits the bottom of the bag to a hopper.

Shaker mechanisms clean filter cake that collects on the inside of a bag as well. The top of the bag is attached to an oscillating arm which creates a sinusoidal wave in the bag to dislodge the dust cake.

Pulse jet cleaning techniques employs a short pulse of compressed air that enters the interior top portion of the filter tube. As the pulse cleaning air passes through the tube venture it aspirates secondary air and the resulting air mass violently expands the bag and casts off the collected dust cake. The bag will typically snap right back to the cage support and go right back into service collecting particulate.

Of the three cleaning techniques the pulse jet is the most stressful on the filter media. However, in recent years industrial process engineers have increasingly selected pulse jet bag houses.

The need for high temperature (up to 200° C.), thermally stable, chemically resistant filter media in bag houses narrows the choice of filter media to only a few viable candidates for pulse jet applications. Common high temperature textiles comprise polytetrafluoroethylene (PTFE), fiberglass, or polyimides (polyimides are stable for continuous use to 260° C.). When the effect of high temperature is combined with the effect of oxidizing agents, acids or bases, there is a tendency for fiberglass and polyimide media to fail prematurely. Thus, there is a preference for using PTFE. Commercially available PTFE fabrics are supported needle felts of PTFE fiber. These felts usually weight from 20-26 oz/yd$^2$ and are reinforced with a multifilament woven scrim (4-6 oz/yd$^2$). The felts are made up of staple fibers, (usually 6.7 denier/filament, or 7.4 dtex/filament) and 2-6 inches in length. This product works similarly to many other felted media in that a primary dust cake "seasons" the bag. This seasoning, sometimes called in-depth filtration, causes the media to filter more efficiently but has a drawback in that the pressure drop increases across the media during use. Eventually the bag will blind or clog and the bags will have to be washed or replaced. In general, the media suffers from low filtration efficiency, blinding and dimensional instability (shrinkage) at high temperatures.

Another type of structure designed for high temperatures is described in U.S. Pat. No. 5,171,339. A bag filter is disclosed that comprises a bag retainer clothed in a filter bag. The cloth of said filter bag comprises a laminate of a felt of poly(m-phenylene isophthalamide), polyester or polyphenylene-sulfide fibers having a thin nonwoven fabric of poly(p-phenylene terephthalamide) fibers needled thereto, the poly(p-phenylene terephthalamide) fabric being positioned at the surface of the filter bag first exposed to the hot particle laden gas stream. The poly (p-phenylene terephthalamide) fabric can have a basis weight of from 1 to 2 oz/yd$^2$.

A two layer product of porous expanded PTFE membrane (ePTFE) laminated to woven porous expanded PTFE fiber fabric has also been used. Commercial success of this product has not been realized due to several reasons, but primarily due to the woven fiber fabric backing not wearing well on the pulse jet cage supports. The woven yarns slide on themselves and create excessive stress on the membrane, resulting in membrane cracks.

Nonwoven fabrics have been advantageously employed for manufacture of filter media. Generally, nonwoven fabrics employed for this type of application have been entangled and integrated by mechanical needle-punching, sometimes referred to as "needle-felting", which entails repeated insertion and withdrawal of barbed needles through a fibrous web structure. While this type of processing acts to integrate the fibrous structure and lend integrity thereto, the barbed needles inevitably shear large numbers of the constituent fibers, and undesirably create perforations in the fibrous structure, which act to compromise the integrity of the filter and can inhibit efficient filtration. Needle-punching can also be detrimental to the strength of the resultant fabric, requiring that a suitable nonwoven fabric have a higher basis weight in order to exhibit sufficient strength for filtration applications.

U.S. Pat. No. 4,556,601 to Kirayoglu discloses a hydroentangled, nonwoven fabric, which may be used as a heavy-duty gas filter. This filtration material however, cannot be subjected to a shrinkage operation. Exposure of the described fabric to a shrinkage operation is believed to have a negative effect on the physical performance of the filtration material.

U.S. Pat. No. 6,740,142 discloses nanofibers for use in bag house filters. A flexible bag is at least partially covered by a layer having a basis weight of 0.005 to 2.0 grams per square meter (gsm) and a thickness of 0.1 to 3 microns. The layer comprises a polymeric fine fiber with a diameter of about 0.01 to about 0.5 micron, but is limited in basis weight due to the limitations of the process used to produce it. The limitation in basis weight of the layer in the '142 patent significantly reduces the lifetime of the filter medium and severely reduces the ability of the filter to survive cleaning cycles.

The present invention is directed to a filter media which is formed through bonding of a nanoweb layer to a substrate by hydroentanglement, needle punching, or other bonding means. This construction provides a filter media having the requisite strength characteristics, without possessing the limited performance of the product of the '142 patent. The filtration media of the present invention also demonstrates a highly desirable uniformity for cost-effective use.

SUMMARY OF THE INVENTION

A first embodiment of the present invention is a bag filter comprising a support structure clothed in a filter bag, the cloth of said filter bag comprising a composite of at least one substrate layer and a first nanoweb layer having a basis weight of greater than about 2 gsm bonded thereto in a face-to-face relationship.

Another embodiment of the present invention is a bag filter comprising a support structure clothed in a filter bag, the cloth of said filter bag comprising a composite of at least one substrate layer bonded to a web in a face to face relationship, the web comprising a nanoweb layer having a basis weight of greater than about 0.1 gsm and a scrim bonded to the nanoweb layer and wherein the web is positioned on the upstream side of the filter bag.

DETAILED DESCRIPTION

The term "nanofiber" as used herein refers to fibers having a number average diameter or cross-section less than about 1000 nm, even less than about 800 nm, even between about 50 nm and 500 nm, and even between about 100 and 400 nm. The term diameter as used herein includes the greatest cross-section of non-round shapes.

The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials. A "nanoweb" is a nonwoven web that comprises nanofibers.

A "scrim" is a support layer and can be any planar structure to which the nanoweb layer can be bonded, adhered or laminated. Advantageously, the scrim layers useful in the present invention are spunbond nonwoven layers, but can be made from carded webs of nonwoven fibers and the like.

The object of the present invention is to provide a high-efficiency dust-collecting filter cloth for bag filter units for exhaust gas dust collection, and to provide a bag filter comprising the filter cloth. The filter includes at least a nanoweb layer in combination with a substrate layer in a mechanically stable filter structure. These layers together provide excellent filtering and high particle capture efficiency at minimum fluid flow restriction through the filter media. The substrate can be positioned in the fluid stream upstream, downstream or in an internal layer.

In one embodiment the filter comprises a filtration medium including a nanoweb layer having a basis weight of greater than about 2 gsm, or greater than about 3 gsm, or greater than about 6 gsm, or even greater than about 10 gsm. The filtration medium further comprises a substrate to which the nanoweb is bonded in a face-to-face relationship. Advantageously, the nanoweb layer is positioned on the upstream surface or side of the filter bag, i.e. on the surface which is first exposed to the hot, particle-laden gas stream.

In a further embodiment the filter comprises a composite of at least one substrate layer having a web bonded thereto in a face-to-face relationship, the web being positioned on the upstream side of the filter bag, i.e. at the surface of the filter bag first exposed to the hot, particle-laden gas stream, wherein the web comprises a nanoweb layer having a basis weight of greater than about 0.1 gsm and a scrim bonded to the nanoweb layer. In some cases it is advantageous that the scrim is positioned in between the nanoweb and the substrate, while in other cases it is desirable that the nanoweb layer be positioned between the scrim and the substrate.

The filter of the invention can be used in a variety of filtration applications including pulse clean and non-pulse cleaned filters for dust collection, gas turbines and engine air intake or induction systems, gas turbine intake or induction systems, heavy duty engine intake or induction systems, light vehicle engine intake or induction systems, Zee filter, vehicle cabin air, off road vehicle cabin air, disk drive air, photocopier-toner removal, HVAC filters for both commercial or residential filtration applications, and vacuum cleaner applications.

The substrate layer of the invention can be formed from a variety of conventional fibers including cellulosic fibers such as cotton, hemp or other natural fibers, inorganic fibers including glass fibers, carbon fibers or organic fibers such as polyesters, polyimides, polyamides, polyolefins, or other conventional fibers or polymeric materials and mixtures thereof.

The substrate layer of the filter bag of the invention can be woven or non-woven. In woven bags, the fibers are typically formed into an interlocking mesh of fiber in a typical woven format. Non-woven fabrics are typically made by loosely forming the fibers in no particular orientation and then binding the fibers into a filter fabric. One preferred mode of constructing the elements of the invention includes using a felt media as a substrate. Felts are a compressed, porous, non-woven fabric made by laying discrete natural or synthetic fibers and compressing the fibers into a felt layer using commonly available felt bonding technology that would be known to one skilled in the art.

Fibers are typically used that exhibit excellent resilience and resistance to the effects of the passage of air and the entrapment of particulates. The fabrics can have stability with respect to chemical particulates, and can be stable with respect to varying temperatures of both the air passing through the bag house and the temperature of the particulate entrained on the filter surface.

The filter structures of the invention are typically maintained in their useful open shape by supporting the substrate plus nanoweb layer composite on a suitable support structure such as a retainer at the neck of a bag, or a support structure can be located in the interior of the bag. Such supports can be formed from linear members in the form of a wound wire or cage-like structure. Alternatively, the support can comprise a perforated ceramic or metal structure that mimics the shape of the bag. If the support structure contacts the filter substrate over a significant fraction of its surface area, the support structure should be permeable to the passage of air through the structure and should provide no incremental increase in pressure drop over the filter bag. Such support structures can be formed such that they contact the entirety of the interior of the filter bag and maintain the filter bag in an efficient filtration shape or confirmation.

A process for combining the nanoweb layers with the substrate to produce the present composite structure is not specifically limited. The nanofibers of the nanoweb layer can be physically entwined in the substrate layer, or they can be bonded by inter-fusion of the fibers of the nanoweb layer with those of the substrate, for example by thermal, adhesive or ultrasonic lamination or bonding.

Thermal methods for bonding the substrate layer to the nanoweb layer or a nanoweb plus scrim layer include calendering. "Calendering" is the process of passing a web through a nip between two rolls. The rolls may be in contact with each other, or there may be a fixed or variable gap between the roll surfaces. Advantageously, in the calendering process, the nip is formed between a soft roll and a hard roll. The "soft roll" is a roll that deforms under the pressure applied to keep two rolls in a calender together. The "hard roll" is a roll with a surface in which no deformation that has a significant effect on the process or product occurs under the pressure of the process. An "unpatterned" roll is one which has a smooth surface within the capability of the process used to manufacture them. There are no points or patterns to deliberately produce a pattern on the web as it passed through the nip, unlike a point bonding roll. The hard roll in the process of calendering used in the present invention can be patterned or unpatterned.

Adhesive lamination can be carried out in conjunction with calendering or by application of pressure by other means to the laminate in the presence of a solvent based adhesive at low temperatures, for example room temperature. Alternatively a hot melt adhesive can use used at elevated temperatures. One skilled in the art will readily recognize suitable adhesives that can be used in the process of the invention.

Examples of methods of entwining the fibers according to such a physical bonding are needle punch processing and water-jet processing, otherwise known as hydroentangling or spun lacing.

One process commonly used in the fabric product manufacturing industry for joining together fabric sheets is called mechanical interlocking, also known as needle punching or needling, and consists essentially of tucking a small bundle of individual fibers down through a carded batt of fibers in such large numbers of penetrations that a cohesive textile structure is formed, as disclosed in U.S. Pat. Nos. 3,431,611 and 4,955,116

For the process of manufacturing the filter of the present invention it is desirable to perform needle punch processing (or water-jet processing) on the high-density layer (substrate) side of the nonwoven fabric. Compared to the case where needle punch processing is performed on the low-density layer (nanoweb) side, needle punch processing on the high-density layer side can suppress collapse or deformation of the pores accompanied by intertwining, as well as undesirable widening of the pore size. With this arrangement, the average pore size and the total pore area defined above can be secured, thereby suppressing lowering of the initial cleaning efficiency with respect to smaller particles. The requirements for performing needle punch processing are not specifically limited. However, excessively increasing the needle depth may undesirably widen the pore size (diameter) of the composite filter media. Conversely, excessively reducing the needle depth may not attain sufficient intertwining of the webs and fibers. Generally, it is preferable to set the needle depth in the range from 8 to 15 mm. Any kind of needle known in needle punch processing can be used for the needle punching in this invention. However, since the needle diameter is larger than the diameter of the pores in the high-density layer, the pore diameter in the high-density layer may increase by the needle punch processing. Accordingly, it is preferable to set the number of needles (the number for penetration) per unit area in the range from about 40 to about 100 perforations/cm$^2$, in order to suppress undesirable widening of the pore diameter, and to perform sufficient intertwining operation. Further, no more than about 25% of the surface area of the low density layer should be perforated.

The as-spun nanoweb comprises primarily or exclusively nanofibers, advantageously produced by electrospinning, such as classical electrospinning or electroblowing, and in certain circumstances, by meltblowing or other such suitable processes. Classical electrospinning is a technique illustrated in U.S. Pat. No. 4,127,706, incorporated herein in its entirety, wherein a high voltage is applied to a polymer in solution to create nanofibers and nonwoven mats. However, total throughput in electrospinning processes is too low to be commercially viable in forming heavier basis weight webs.

The "electroblowing" process is disclosed in World Patent Publication No. WO 03/080905, incorporated herein by reference in its entirety. A stream of polymeric solution comprising a polymer and a solvent is fed from a storage tank to a series of spinning nozzles within a spinneret, to which a high voltage is applied and through which the polymeric solution is discharged. Meanwhile, compressed air that is optionally heated is issued from air nozzles disposed in the sides of, or at the periphery of the spinning nozzle. The air is directed generally downward as a blowing gas stream which envelopes and forwards the newly issued polymeric solution and aids in the formation of the fibrous web, which is collected on a grounded porous collection belt above a vacuum chamber. The electroblowing process permits formation of commercial sizes and quantities of nanowebs at basis weights in excess of about 1 gsm, even as high as about 40 gsm or greater, in a relatively short time period.

A scrim can be arranged on the collector so as to collect and combine the nanofiber web spun on the scrim. Examples of the substrate may include various nonwoven cloths, such as meltblown nonwoven cloth, needle-punched or spunlaced nonwoven cloth, woven cloth, knitted cloth, paper, and the like, and can be used without limitations so long as a nanofiber layer can be added on the substrate. The nonwoven cloth can comprise spunbond fibers, dry-laid or wet-laid fibers, cellulose fibers, melt blown fibers, glass fibers, or blends thereof. Alternatively, the nanoweb layer can be deposited directly onto the felt substrate.

Polymer materials that can be used in forming the nanowebs of the invention are not particularly limited and include both addition polymer and condensation polymer materials such as, polyacetal, polyamide, polyester, polyolefins, cellulose ether and ester, polyalkylene sulfide, polyarylene oxide, polysulfone, modified polysulfone polymers, polyamideimide, polyimides, and mixtures thereof. Preferred materials that fall within these generic classes include, poly (vinylchloride), polymethylmethacrylate (and other acrylic resins), polystyrene, and copolymers thereof (including ABA type block copolymers), poly (vinylidene fluoride), poly (vinylidene chloride), polyvinylalcohol in various degrees of hydrolysis (87% to 99.5%) in crosslinked and non-crosslinked forms, polyamideimide, and polyimide. Preferred addition polymers tend to be glassy (a $T_g$ greater than room temperature). This is the case for polyvinylchloride and polymethylmethacrylate, polystyrene polymer compositions or alloys or low in crystallinity for polyvinylidene fluoride and polyvinylalcohol materials. One preferred class of polyamide condensation polymers are nylon materials, such as nylon-6, nylon-6,6, nylon 6,6-6,10, and the like. When the polymer nanowebs of the invention are formed by meltblowing, any thermoplastic polymer capable of being meltblown into nanofibers can be used, including polyolefins, such as polyethylene, polypropylene and polybutylene, polyesters such as poly (ethylene terephthalate) and polyamides, such as the nylon polymers listed above.

It can be advantageous to add known-in-the-art plasticizers to the various polymers described above, in order to reduce the $T_g$ of the fiber polymer. Suitable plasticizers will depend upon the polymer to be electrospun or electroblown, as well as upon the particular end use into which the nanoweb will be introduced. For example, nylon polymers can be plasticized with water or even residual solvent remaining from the electrospinning or electroblowing process. Other known-in-the-art plasticizers which can be useful in lowering polymer $T_g$ include, but are not limited to aliphatic glycols, aromatic sulphanomides, phthalate esters, including but not limited to those selected from the group consisting of dibutyl phthalate, dihexl phthalate, dicyclohexyl phthalate, dioctyl phthalate, diisodecyl phthalate, diundecyl phthalate, didodecanyl phthalate, and diphenyl phthalate, and the like. The *Handbook of Plasticizers*, edited by George Wypych, 2004 Chemtec Publishing, incorporated herein by reference, discloses other polymer/plasticizer combinations which can be used in the present invention.

Examples

Nanoweb was produced with a basis weight of from 2 to 10 grams per square meter (gsm) spun from polyamide PA 6/6 nanofiber using the process of World Patent Publication No. WO 03/080905. Mean fiber diameter was about 400 nm. The nanoweb was bonded to a polyester felt of nominal basis weight 500 gsm by several techniques.

Needlepunching

The nanoweb was spun onto a 30 gsm polyester spun laced scrim (Kolon, Korea) which was needle punched onto the polyester felt.

Needlepunching entailed bringing the felt and the scrim+nanoweb structure together with the nanoweb on the inside against the felt and needle punching from the felt side. Line speed was 1.5 meter/min. The number of penetrations per inch (PPI) was 383.

Adhesive Bonding

The nanoweb was adhesively bonded to the polyester felt. Polyurethane adhesive was applied to the felt at 130° C. Then the nanoweb was adhered to the adhesive with light pressure.

Solvent Adhesive Bonding

The nanoweb was adhesively bonded to the polyester felt. The lamination process entailed applying polyurethane adhesive in trichloroethylene to the felt at room temperature. Then the nanoweb was adhered to the adhesive with light pressure

Calendering

The nanoweb was adhesively bonded to the polyester felt by running the nanoweb+felt+adhesive through the nip between two rolls. Line speed was 0.8 yards per minute. Roll temperature was 180° C.

Comparative Examples

Filters that comprised the nanoweb were compared to filters made from commercially available filter media. Comparative examples of polyester felt made of 2.5 dtex staple fiber (TTL Germany, product PES 3455-3/01), ePTFE membrane laminated on polyester felt (TTL Germany, product PES 3054-1/01 T01T), and polyester felt coated with PTFE polymer (TTL Germany, product PES 3455-3/01 T95) were tested. All those filters were of comparable weight (about 500 gsm) and thickness.

Filtration efficiency, pressure drop and cycle time were measured according VDI 3926, the text of which is hereby incorporated by reference.

In VDI 3926, filtration efficiency (also called dust leakage) is measured in micrograms per cubic meter ($\mu g/m^3$), pressure drop is measured in Pascals (Pa) and cycle time is measured in seconds(s). Filtration efficiency represents the amount of dust passing through the filter. The pressure drop is the differential pressure between the 2 faces of the filters. The cycle time is the duration between 2 pulses to release the dust cake. When a certain pressure drop is obtained (in VDI 3926 the maximum pressure drop is set at 1000 Pa) a pulse (counter pressure) is automatically created. The VDI 3926 is based on an initial 30 cycles, followed by 10,000 cycles to simulate filter aging, and finally another 30 cycles. The filtration efficiency, pressure drop and cycle time are measured at the end of the last 30 cycles.

A good filter demonstrates a low filtration efficiency number (low leakage), low pressure drop and long cycle times. Low pressure drop will correspond to energy saving for the end user (less pressure to push the gas through the filter), long cycle time indicate a longer filter life. In reality, cycle time of less than 30 seconds indicate the filter bag must be replaced.

Table 1 below shows the filtration efficiency, pressure drop and cycle time measured according to VDI 3926.

TABLE 1

| Nanoweb basis weight (gsm) | Bonding Method | Filtration efficiency (μg/m3) | Final delta P (Pa) | Cycle time (s) |
|---|---|---|---|---|
| 10 | Needle punch | 200 | 370 | 93 |
| 10 | Hot melt | 30 | 303 | 240 |
| 10 | Solvent adhesive | 27.1 | 383 | 136 |
| 10 | Hot melt | 23.3 | 336 | 257 |
| 5.9 | Hot melt | 27.1 | 313 | 177 |
| 3.6 | Hot melt | 21.9 | 188 | 293 |
| NA | PET felt 2.5 dtex | 756 | 565 | 34 |
| NA | PET felt with ePTFE membrane | 5 | 520 | 168 |
| NA | PET felt with PTFE coating | 303 | 860 | 7 |

It can be seen from Table 1 that the nanoweb containing filters offer significant improvement in filtration efficiency versus both polyester felt and PTFE-coated polyester felt, and is practically equivalent to a filter media made of an ePTFE/polyester felt laminate. Compared to this last filter media, nanoweb bonded to felt offers however the advantages of lower pressure drop and longer cycle time.

Table 2 shows the filtration efficiencies as a function of temperature for samples of 10 gsm nanoweb laminated to felt, and PTFE membrane laminated to felt.

TABLE 2

| Temp ° C. | PET felt with 10 gsm nanoweb (needle punched) | PET felt/ePTFE membrane laminate |
|---|---|---|
| 26 | 30.0 | 5.0 |
| 100 | 22.3 | NA |
| 130 | 81.2 | 54.1 |
| 155 | 98.7 | 162 |

The nanoweb is superior to the ePTFE/felt laminate at the highest temperature of the test.

A comparative example was made according to the description in U.S. Pat. No. 6,740,142. A precursor laminate was produced by spinning a nanoweb with a basis weight of 2 grams per square meter (gsm) directly onto a polyester felt from polyamide PA 6/6 nanofiber using the process of World Patent Publication No. WO 03/080905. Mean fiber diameter was about 400 nm. Consolidated web samples were produced by holding the precursor web at 227° C. in a press for 60 seconds and under low pressure in order to reproduce the recommended lamination conditions of the '142 patent.

Both the consolidated and precursor webs had poor adhesion of the nanoweb to the felt, and the nanoweb could be easily separated from the felt by light abrasion on the nanoweb surface with a thumb. The consolidated sample was subjected to VDI 3926 and survived less than 30 cycles before delaminating.

We claim:

1. A bag filter comprising a support structure clothed in a filter bag, the cloth of said filter bag consisting of a composite of one substrate layer and a nanoweb layer having a basis weight of greater than about 3 gsm bonded thereto in a face-to-face relationship by needle punching, wherein the substrate layer and the nanoweb layer are needle punched on the substrate layer side with about 40 to 100 perforations/cm$^2$, and 25% or less of the nanoweb layer is perforated.

2. The bag filter of claim 1, wherein the nanoweb is positioned on the upstream side of the filter bag.

3. The bag filter of claim 1, wherein the substrate layer and nanoweb layer remain bonded after the filter has been subjected to VDI 3926 for 30 cycles.

4. The bag filter of claim 1, wherein the substrate layer independently comprises fiber selected from polyester fiber, carbon fiber, polyimide fiber, glass fiber, and mixtures thereof.

5. A bag filter comprising a support structure clothed in a filter bag, the cloth of said filter bag consisting of a composite of one substrate layer and a nanoweb layer having a basis weight of greater than about 3 gsm bonded thereto in a face-to-face relationship by needle punching, wherein the nanoweb is formed of nanofibers having a number average diameter of 800 nm or less, and wherein the substrate layer and the nanoweb layer are needle punched on the substrate layer side with about 40 to 100 perforations/cm$^2$, and 25% or less of the nanoweb layer is perforated.

* * * * *